United States Patent [19]
Bruns et al.

[11] Patent Number: 5,244,548
[45] Date of Patent: Sep. 14, 1993

[54] MULTI-CATHODE ECM APPARATUS, METHOD, AND PRODUCT THEREFROM

[75] Inventors: Norbert A. Bruns; Edward C. Bruns, both of Cincinnati, Ohio; Richard F. Fussner, Brookville, Ind.; John S. Reynolds, Maineville, Ohio

[73] Assignee: Lehr Precision Inc., Cincinnati, Ohio

[21] Appl. No.: 879,791

[22] Filed: May 6, 1992

[51] Int. Cl.$^5$ .................... B23H 3/04; B23H 7/30; B23H 9/10
[52] U.S. Cl. .................... 204/129.1; 204/224 M; 204/225
[58] Field of Search ............... 204/129.1, 224 M, 225

[56] References Cited

U.S. PATENT DOCUMENTS

| | | | |
|---|---|---|---|
| 3,459,645 | 8/1969 | Wilson et al. | 204/224 M X |
| 3,515,659 | 6/1970 | Broat et al. | 204/224 |
| 4,052,284 | 10/1977 | Schrader | 204/224 M |
| 4,256,555 | 3/1981 | Wilson et al. | 204/129.5 |
| 4,851,090 | 7/1989 | Burns et al. | 204/129.7 |
| 4,999,093 | 3/1991 | Moracz | 204/129.1 |

Primary Examiner—Donald R. Valentine
Attorney, Agent, or Firm—Francis L. Conte

[57] ABSTRACT

An apparatus for electrochemically machining a workpiece having first and second platforms and an airfoil extending transversely therebetween includes a first cathode trio having a center cathode disposed between first and second cathodes. The center cathode is configured for electrochemically machining a first side of the airfoil, and the first and second cathodes are configured for electrochemically machining at least the first and second platforms adjacent to the airfoil first side. The first and second cathodes are movable relative to the center cathode so that they move away from each other and toward the opposing platforms during machining. A second cathode trio is provided for electrochemically machining the airfoil second side. The apparatus is effective for practicing an improved method of electrochemically machining the workpiece by moving the first and second cathode trios toward the workpiece first and second side, and moving the first and second cathodes of each of the cathode trios toward the airfoil first and second sides and toward the first and second platforms relative to movement of the center cathodes thereof. The resulting product formed by the method requires little or no benching of the airfoil and platforms.

20 Claims, 8 Drawing Sheets

5,244,548

MULTI-CATHODE ECM APPARATUS, METHOD, AND PRODUCT THEREFROM

The present invention relates generally to electrochemically machining, and, more specifically, to electrochemically machining a workpiece having a center portion extending transversely between two end portions such as found in gas turbine engine double shrouded vanes or shrouded blades.

BACKGROUND OF THE INVENTION

Electrochemical machining (hereinbelow also referred to alternatively as simply machining) is a conventional process in which a workpiece is typically provided with a positive voltage to create an anode, and an electrode is provided with a negative voltage to create a cathode. DC voltages between about 5–25 volts and up to about 15–30,000 amps are typically used. An electrolyte is then channeled in the space or gap between the workpiece and the cathode for electrochemically machining the workpiece. Such gap must be accurately maintained to avoid damaging sparking, or arcing, which would occur with gaps which are too small or cause too little electrolyte flow during operation.

A gas turbine engine stator vane as used in compressors thereof, for example, typically include radially outer and inner shrouds formed integrally with an airfoil extending transversely therebetween. The radially inner surface of the outer shroud and the radially outer surface of the inner shroud are referred to herein as platforms which form a portion of the flowpath for confining the airflow between the shrouds and over the airfoil.

To manufacture the vane to its final dimensions, an oversized workpiece is conventionally provided and the excess material thereof is accurately removed to form the required final configurations of the airfoil and platforms. Electrochemical machining is conventionally known for simultaneously removing material from both an airfoil and one of the platforms by using a single cathode which is translated simultaneously toward both the airfoil and the platform. However, since the vane includes two platforms, it is conventionally manufactured in either two operations for machining the airfoil and one of the platforms and then the other platform, or, in one prior art apparatus, two cathodes may be used simultaneously for machining both platforms as well as the airfoil.

Since electrochemical machining utilizes the surface of the cathode to carry current between the anode and the cathode through the electrolyte, the cathode surface should be suitably configured to conform to the workpiece as close as possible to its finally required configuration and dimensions, preferably without additional manufacturing operations such as benching. Benching is a conventional operation for manual grinding or polishing of the workpiece to remove any irregularities or excess material remaining after electrochemical machining.

OBJECTS OF THE INVENTION

Accordingly, one object of the present invention is to provide a new and improved method and apparatus for electrochemically machining a workpiece having opposing platforms.

Another object of the present invention is to provide an electrochemical machining apparatus effective for simultaneously machining both the airfoil and the platforms of the workpiece.

Another object of the present invention is to provide an improved apparatus for electrochemically machining a workpiece in a single operation to its final configuration with reduced or eliminated need for benching thereof.

SUMMARY OF THE INVENTION

An apparatus for electrochemically machining a workpiece having first and second platforms and an airfoil extending transversely therebetween includes a first cathode trio having a center cathode disposed between first and second cathodes. The center cathode is configured for electrochemically machining a first side of the airfoil, and the first and second cathodes are configured for electrochemically machining at least the first and second platforms adjacent to the airfoil first side. The first and second cathodes are movable relative to the center cathode so that they move away from each other and toward the opposing platforms during machining.

The apparatus further includes means for translating the first, second, and center cathodes toward the workpiece, with the first and second cathodes being movable also relative to the center cathode. In the preferred embodiment, a second cathode trio is provided for electrochemically machining the airfoil second side simultaneously with machining of the airfoil first side, and additional translating means are provided for moving the first and second cathodes of the second cathode trio relative to the center cathode thereof.

The apparatus is effective for practicing an improved method of electrochemically machining the workpiece by moving the first and second cathode trios toward the workpiece first and second sides, and moving the first and second cathodes of each of the cathode trios toward the airfoil first and second sides and toward the first and second platforms relative to movement of the center cathodes thereof. The resulting product formed by the method requires little or no benching of the airfoil and platforms.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which:

FIG. 3 is a perspective view of the first cathode trio illustrated in FIG. 2 including a longitudinal sectional plane designated by line 2—2 through which FIG. 2 is representative.

FIG. 9 is a perspective view of the second cathode trio illustrated in FIG. 2 including a longitudinal sectional plane indicated by line 2—2 through which FIG. 2 is representative.

DESCRIPTION OF THE PREFERRED EMBODIMENT(S)

Figure 1:
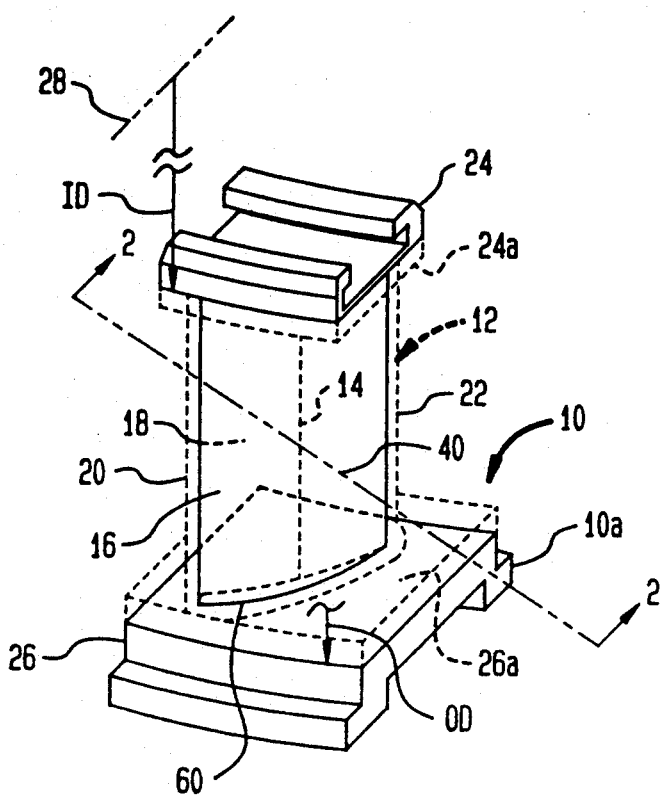
FIG. 1 is a perspective view of an exemplary workpiece in the form of a gas turbine engine stator vane having inner and outer shrouds joined to an airfoil.

Illustrated in FIG. 1 is an exemplary workpiece 10 shown partly in phantom line in the form of a gas turbine engine stator vane typically utilized in a gas turbine engine compressor, for example. The finished vane is designated 10a and is shown in solid line, and results from removing the excess material illustrated in phantom by electrochemical machining (ECM) in accordance with the present invention. Accordingly, the workpiece 10 and the vane 10a are identical to each other except for the excess material.

The workpiece 10 includes an airfoil 12 having a longitudinal or stacking axis 14 which is typically the locus of the centers of gravity of the transverse sections of the airfoil 12. The workpiece 10 has first and second opposite sides 16 and 18 which extend between a leading edge 20 and a trailing edge 22. In this exemplary embodiment, the workpiece 10 further includes a radially inner shroud 24 and a radially outer shroud 26 which are integrally formed with opposite ends of the airfoil 12 transversely, or perpendicularly, to the stacking axis 14.

The vane 10a resulting from removing the excess material from the workpiece 10 is one of many vanes which are circumferentially spaced around a longitudinal centerline axis 28 of a gas turbine engine (not shown). Accordingly, the inner and outer shrouds 24 and 26 have a slight curvature so that they collectively form rings about the centerline axis 28 when assembled in the engine. The radially outer surface of the inner shroud 24 is referred to herein as a first platform 24a, and the radially inner surface of the outer shroud 26 is referred to herein as a second platform 26a, with the first and second platforms 24a, 26a facing each other on both sides of the airfoil 12 and, when finally machined, providing flowpath surfaces for confining the air channeled therebetween and over the airfoil 12.

The excess material which is conventionally provided on the platforms 24a, 26a is typically about 1.5 mm, for example, and the excess material provided around the airfoil 12 is about 2.5 mm, for example. It is one object of the present invention to remove the excess material from the platforms 24a, 26a simultaneously with that from the airfoil 12 in preferably a single electrochemical machining operation for providing a resulting product or vane 10a with finally dimensioned first and second sides 16 and 18 and platforms 24a and 26a. Since the vane 10a is a portion of a ring, the first platform 24a will preferably be arcuate along an inner diameter ID relative to the centerline axis 28, and the second platform 26a will also be preferably arcuate along an outer diameter OD relative to the centerline axis 28.

Figure 2:
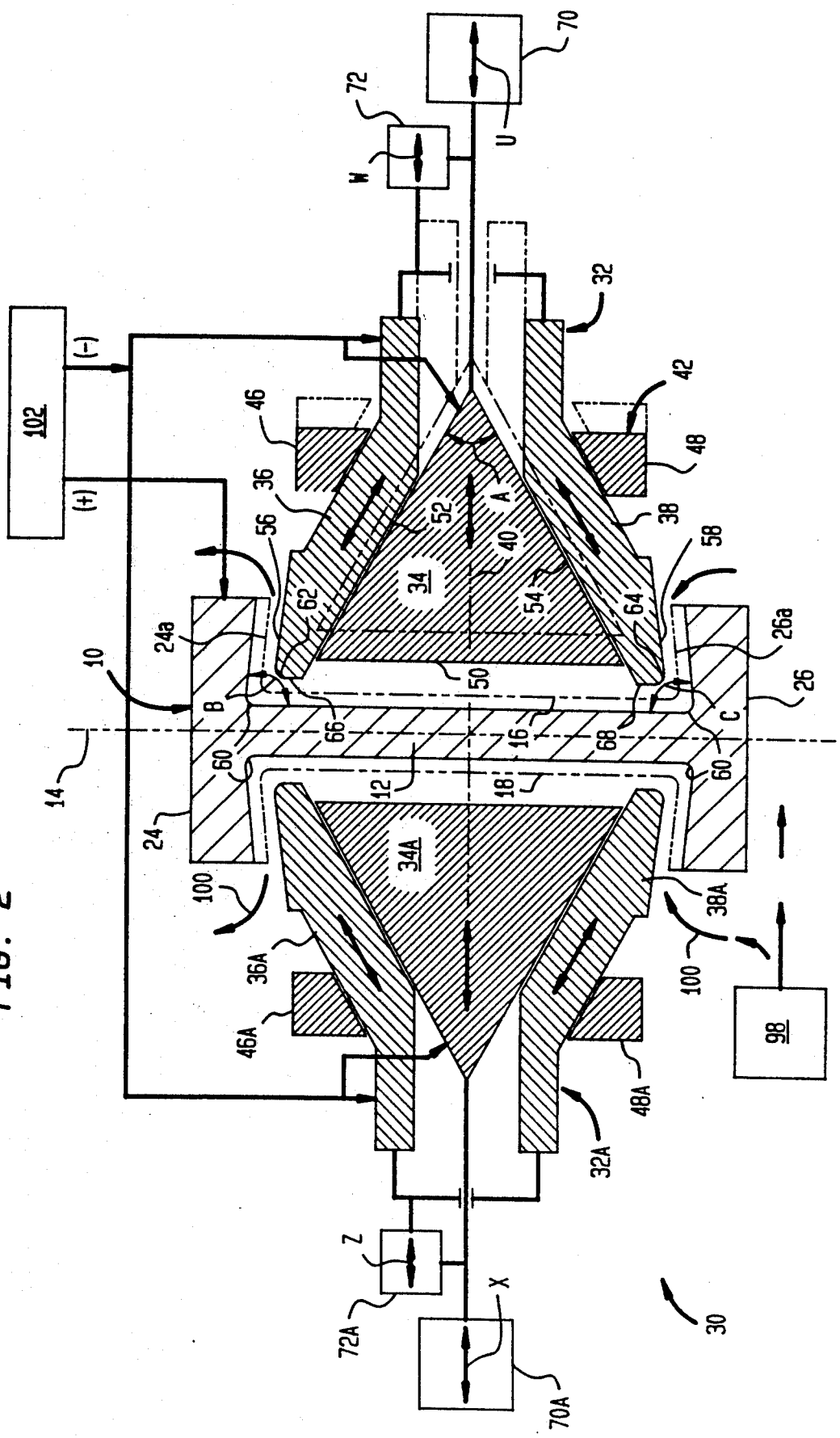
FIG. 2 is a schematic, longitudinal sectional view of an apparatus in accordance with one embodiment of the present invention having first and second cathode trios for electrochemically machining the workpiece illustrated in FIG. 1.

In order to remove the excess material from the workpiece 10, an improved electrochemical machining (ECM) apparatus 30 is disclosed schematically in FIG. 2. The apparatus 30 includes a first cathode trio 32 having a preferably triangular center cathode 34 configured for electrochemically machining the airfoil first side 16 which is shown in phantom line in FIG. 2 before machining and in solid line after machining. The first cathode trio 32 further includes first and second cathodes 36 and 38 which are configured for electrochemically machining at least the first and second platforms 24a and 26a, respectively, adjacent to the airfoil 12, with the first and second cathodes 36 and 38 being preferably slidably movable relative to the center cathode 34.

The first cathode trio 32 is generally symmetrical about the center cathode 34 and is movable generally along a longitudinal axis 40 thereof which axis 40 is also illustrated in FIG. 1 as being preferably disposed generally perpendicularly to the airfoil first side 16 near its center for minimizing total travel of the first cathode trio 32 toward the workpiece 10 from start to finish of the electrochemical machining operation.

Figure 3:
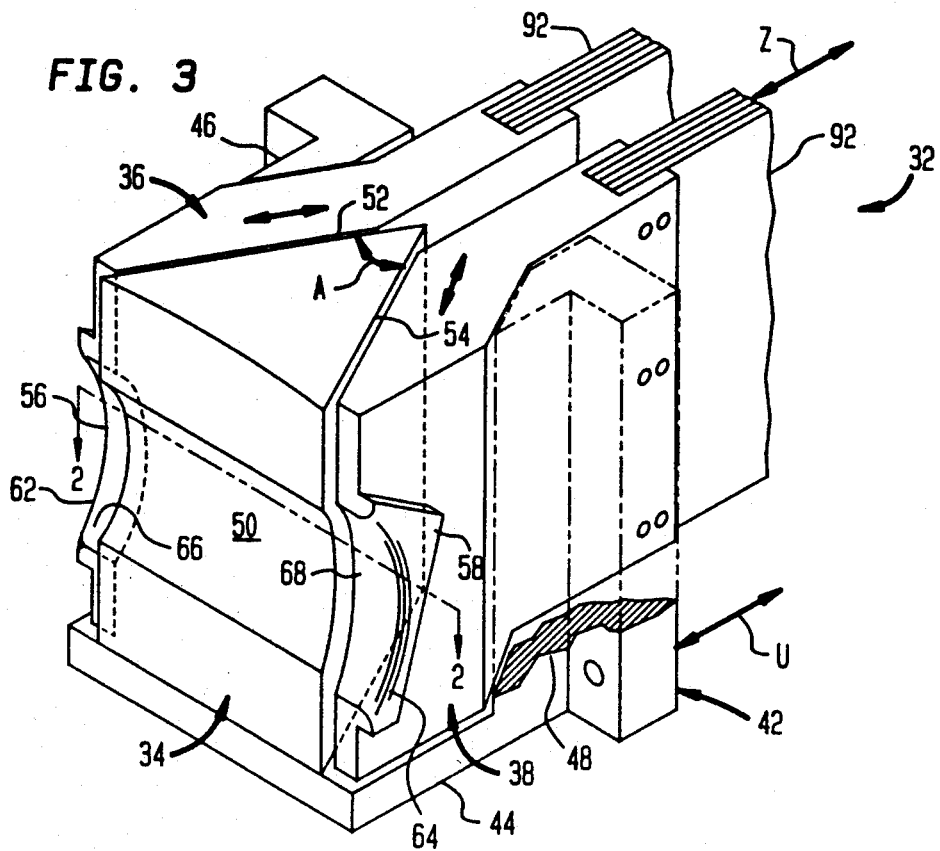

Referring to FIG. 3, the first cathode trio 32 further includes a frame 42 having a base 44 and preferably integral first and second laterally spaced apart guide posts 46 and 48 extending upwardly away from the base 44. The center cathode 34 is preferably fixedly joined to the base 44 (by screws for example, not shown) between and in part forward of the first and second posts 46 and 48. The first cathode 36 is slidably disposed between the center cathode 34 and the first post 46, and the second cathode 38 is similarly slidably disposed between the center cathode 34 and the second post 48.

More specifically, the center cathode 34 includes an imperforate workface 50 configured for electrochemically machining the airfoil first side 16. In the exemplary embodiment illustrated in FIG. 1, the airfoil first side 16 is convex outwardly for forming the suction side of the airfoil 12, and the airfoil second side 18 is concave outwardly for forming the pressure side of the airfoil 12. As shown in FIG. 3, the center cathode workface 50 is concave outwardly and is complementary to the finally desired convex airfoil first side 16. The center cathode 34 further includes first and second preferably straight side ramps 52 and 54 extending rearwardly from the workface 50 to form an acute angle A therebetween, and, thereby, a generally triangular center cathode 34. The angle A is predeterminedly selected for each design to control the relative outward movement of the first and second cathodes 36, 38 away from each other as they are moved forwardly toward the airfoil 12 and relative to the center cathode 34. For example, the angle A may range from about 40° to about 60°. The first and second ramps 52 and 54 are disposed parallel to opposing surfaces of the first and second posts 46 and 48 for forming a constant thickness slot for guiding the first and second cathodes 36 and 38 in sliding movement therebetween. The first and second cathodes 36 and 38, therefore, are inclined along the first and second ramps 52 and 54 for movement therealong.

FIG. 2 is a schematic representation of the entire apparatus 30 including the first cathode trio 32, and FIG. 3 is a perspective view of a portion of an exemplary first cathode trio 32 configured for use in the apparatus 30 illustrated in FIG. 2. FIG. 2 is a section in part through the middle of the first cathode trio 32 illustrated in FIG. 3 taken generally along line 2—2 therein. As shown in FIGS. 2 and 3, the first cathode 36 preferably includes a platform workface 56 disposed transversely to the center cathode workface 50 and configured for electrochemically machining the first platform 24a adjacent to the airfoil first side 16 (see also FIG. 1). Similarly, the second cathode 38 includes a platform workface 58 disposed transversely to the center cathode workface 50 and configured for electrochemically machining the second platform 26a adjacent to the airfoil second side 18. The platform workfaces 56, 58 face outwardly away from each other and generally perpendicularly to the longitudinal axis 40 to face the respective portions of the platforms 24a and 26a.

Figure 4:
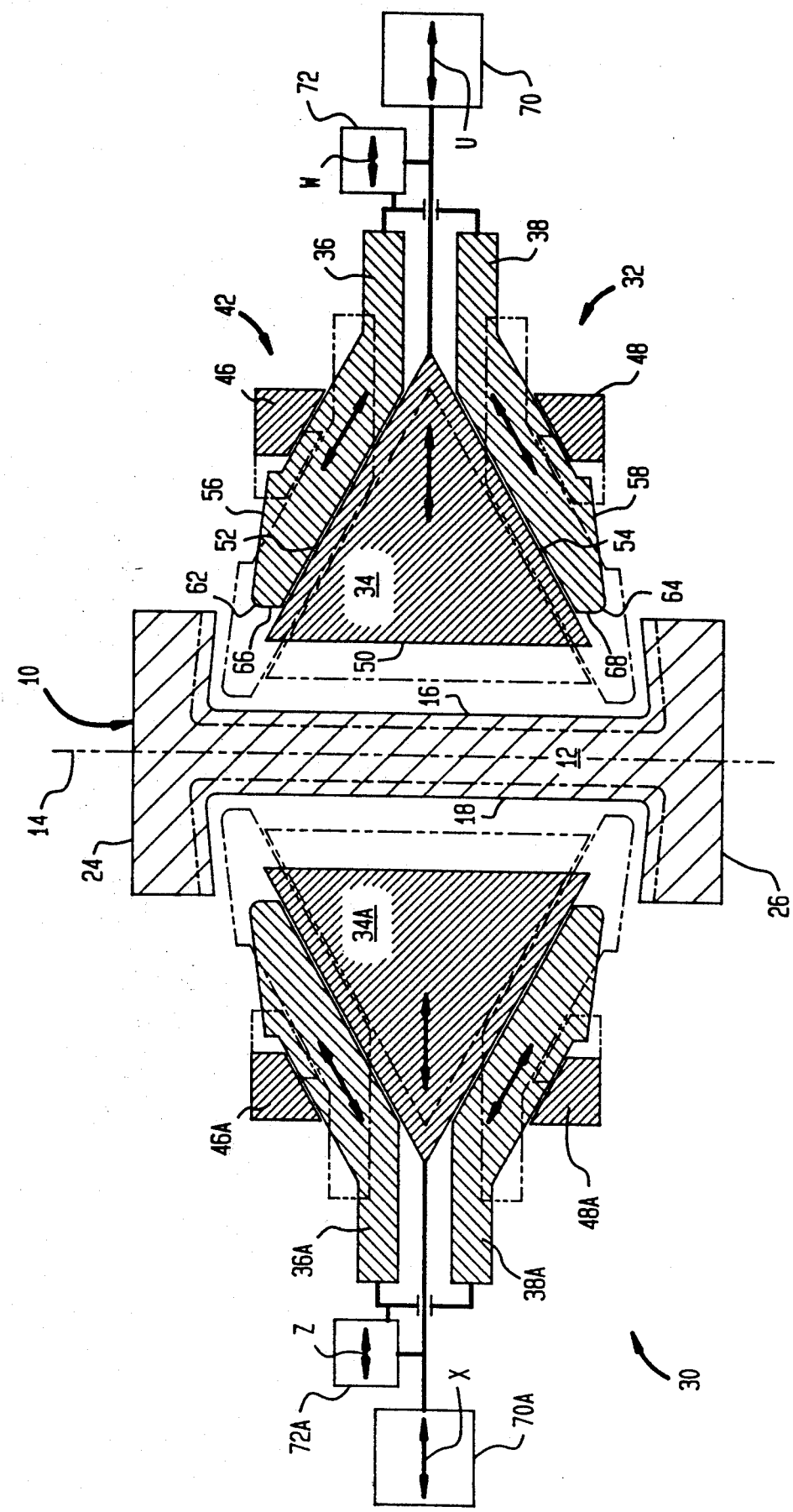
FIG. 4 is a schematic representation of the apparatus illustrated in FIG. 2 wherein the first and second cathode trios are shown in solid line disposed in an initial position adjacent to the workpiece, and in phantom line in their final position after machining the workpiece.

FIG. 2 illustrates in solid line the final position of the first cathode trio 32 after machining of the airfoil 12 and the platforms 24a and 26a which are shown in phantom before machining and in solid line after machining. FIG. 4 illustrates schematically the apparatus 30 with the first cathode trio 32 shown in solid line in its initial position at the commencement of electrochemical machining and in phantom line in its final position after machining. In the initial position of the first cathode trio 32 illustrated in FIG. 4, the first and second cathodes 36 and 38 are retracted rearwardly from the center cathode workface 50 and the center cathode workface 50 is positioned adjacent to the airfoil first side 16 for forming a suitable initial gap therebetween to commence electrochemical machining thereof. As machining of the workpiece 10 commences, the center cathode 30 is translated along the axis 40 toward the airfoil 12, and simultaneously, the first and second cathodes 36 and 38 are independently translated forwardly relative to both the airfoil 12 and the center cathode 34 and, therefore, have a greater forward velocity or feedrate than that of the center cathode 34. As the first and second cathodes 36, 38 slide forwardly over the first and second ramps 52, 54 they move forwardly relative to the center cathode 34 and outwardly away from each other toward the respective platforms 24a, 26a. In this way, as the center cathode workface 50 electrochemically machines the airfoil first side 16, the platform workfaces 56, 58 concurrently machine the platforms 24a, 26a.

Since the platform workfaces 56, 58 are translated both toward the airfoil first side 16 and outwardly away from each other toward the respective platforms 24a, 26a, they may be suitably inclined relative to travel along the longitudinal axis 40 while still effectively machining the respective platforms 24a, 26a. As shown in FIG. 2, the first platform 24a is disposed at an angle B relative to the airfoil 12, and the second platform 26a is disposed at an angle C relative to the airfoil 12. The angles B and C may be about 90° each or may be slightly less, for example down to about 85°, or up to about 95° or more. The platform workfaces 56 and 58 are complementarily inclined for machining the so inclined platforms 24a and 26a without interference during movement of the cathodes 36 and 38.

In the preferred embodiment, the workpiece 10 further includes concave fillets 60 between the airfoil 12 and the first and second platforms 24a, 26a which provide a structural transition therebetween as shown in FIG. 2. And, the first and second cathodes 36 and 38 preferably also include transversely arcuate, or convex, bullnose workfaces 62 and 64, respectively, disposed between the center cathode workface 50 and the first and second cathode platform workfaces 56 and 58, respectively. The arcuate workfaces 62 and 64 are configured complementarily to the fillets 60 at the platforms 24a, 26a for machining the fillets 60 as the cathodes 36 and 38 are moved theretoward.

Also in the preferred embodiment, the first and second cathodes 36, 38 further include transversely straight airfoil workfaces 66 and 68, respectively as shown in FIGS. 2 and 3 which are disposed between the center cathode workface 50 and the respective first and second cathode arcuate workfaces 62 and 64. The airfoil workfaces 66 and 68 are configured complementarily to the airfoil 12 for machining a portion of the airfoil 12 adjacent to the fillets 60. In this way, each of the first and second cathodes 36 and 38 machines a respective portion of the platforms 24a, 26a, and respective fillets 60, and outward portions of the airfoil first side 16 adjacent to the fillets 60 and the respective platforms 24a, 26a. The center cathode workface 50 then machines the remainder of the airfoil first side 16 between the airfoil workfaces 66 and 68. The airfoil workfaces 66 and 68 are imperforate, and the center cathode workface 50 is also imperforate for collectively providing an effectively imperforate surface for simultaneously machining the airfoil first side 16, as well as the fillets 60 and the respective platforms 24a and 26a adjacent thereto. Since the junctions between the center cathode 34 and the first and second cathodes 36 and 38 are planes of sliding contact, electrical current transfer between the airfoil 12 and the cathodes 34, 36, and 38 is substantially continuous and uninterrupted for providing a continuously smooth airfoil first side 16 after machining.

Note that in FIG. 4, the first and second cathodes 36 and 38 are initially positioned behind the center cathode workface 50 at the commencement of machining, but after completion of machining, the respective airfoil workfaces 66 and 68 are positioned ahead of the center cathode workface 50 (see also FIG. 2). It is conventionally known that the equilibrium gap between an electrode and a workpiece which is maintained during electrochemical machining is a function of the feedrate of the electrode. Since the first and second cathodes 36 and 38 necessarily travel forwardly toward the airfoil 12 at a greater rate of feed than that of the center cathode 34, (since they are being translated forwardly relative thereto) the airfoil workfaces 66 and 68 have a greater longitudinal feedrate toward the airfoil first side 16 than that of the center cathode workface 50. Accordingly, a smaller equilibrium gap is required between the airfoil workfaces 66 and 68 and the airfoil 12 than that required for the slower travelling center cathode workface 50. As a result thereof, although the airfoil workfaces 66 and 68 are disposed ahead of the center cathode workface 50 upon completion of machining, the airfoil first side 16 is nevertheless substantially smooth without discontinuities due to electrochemical machining between the opposing platforms 24a and 26a. In this way the need for benching of the airfoil first side 16 is reduced, if not eliminated, by the preferred coordination of the first and second cathodes 36 and 38 relative to the center cathode 34.

Referring again to FIG. 2, the apparatus 30 further includes first means 70 for translating the first cathode trio frame 42, and therefore the center cathode 34, selectively toward and away from the workpiece 10 generally perpendicularly to the stacking axis 14 and parallel to the longitudinal axis 40. The first translating means 70 therefore translates the center cathode 34, as well as the first and second cathodes 36 and 38 riding on the frame 42 in a linear direction designated U, and illustrated by the double headed arrow.

Second means 72 are provided for translating the first and second cathodes 36 and 38 relative to the center cathode 34 selectively toward and away from the workpiece 10 so that as the center cathode 34 machines the airfoil first side 16, the first and second cathodes 36 and 38 slide along the ramps 52 and 54 of the center cathode 34 both toward the workpiece airfoil 12 and away from each other generally parallel to the stacking axis 14 toward the workpiece first and second platforms 24a and 26a for simultaneously machining the platforms 24a and 26a, respectively, as described above. The first and second cathodes 36 and 38 are preferably translated parallel to the longitudinal axis 40 in the direction labeled W, as represented by the double headed arrow, which translation W is relative to the translation U. As the first and second cathodes 36 and 38 translate forwardly in the W direction relative to the center cathode 34, they are confined between the respective ramps 52, 54 and the posts 46 and 48 to move, or slide, outwardly away from each other as described above.

Figure 5:
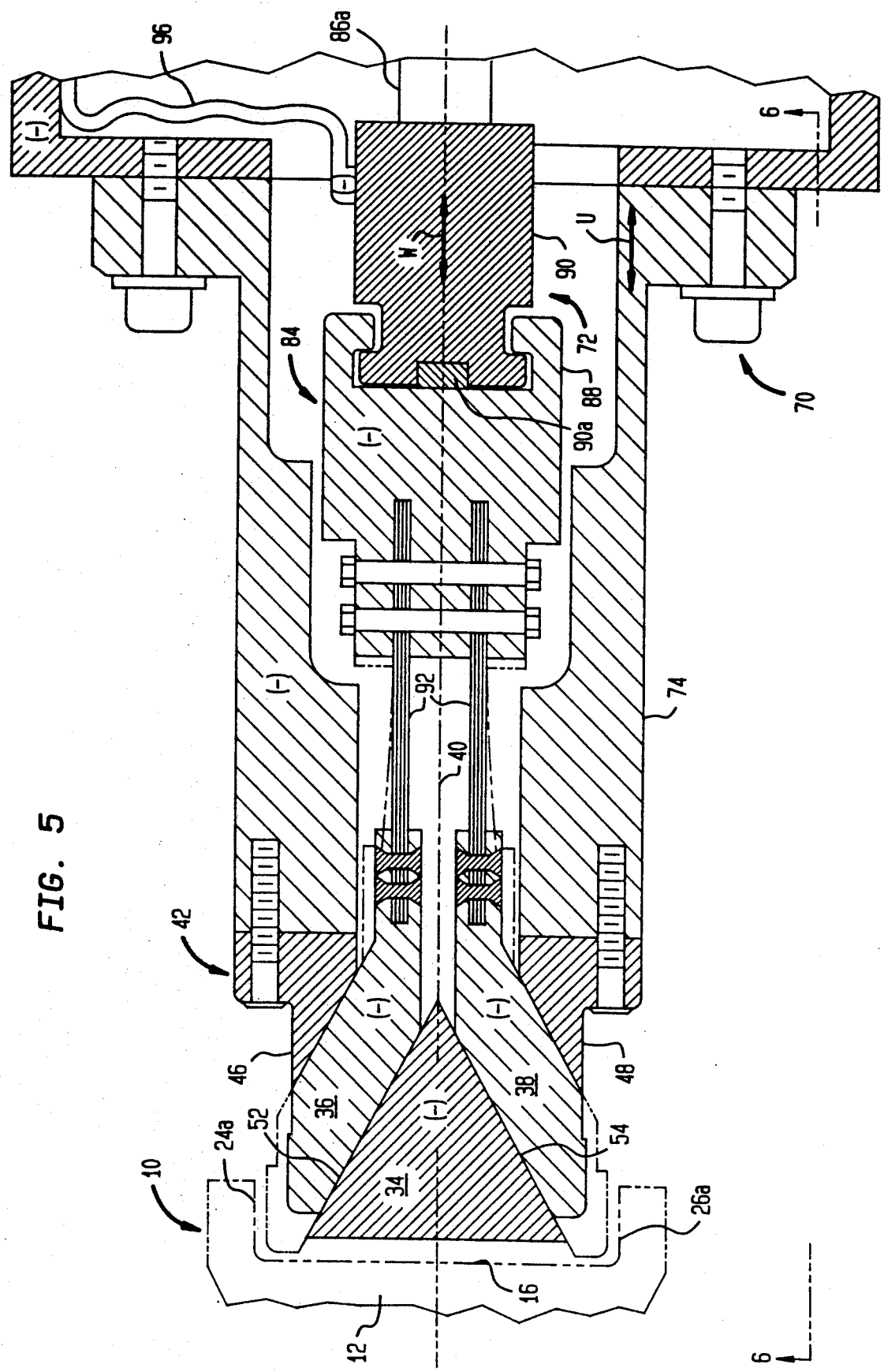
FIG. 5 is a top, longitudinal sectional view of the first cathode trio illustrated in FIG. 2 extending from a supporting arm in accordance with a preferred embodiment of the present invention.
Figure 6:
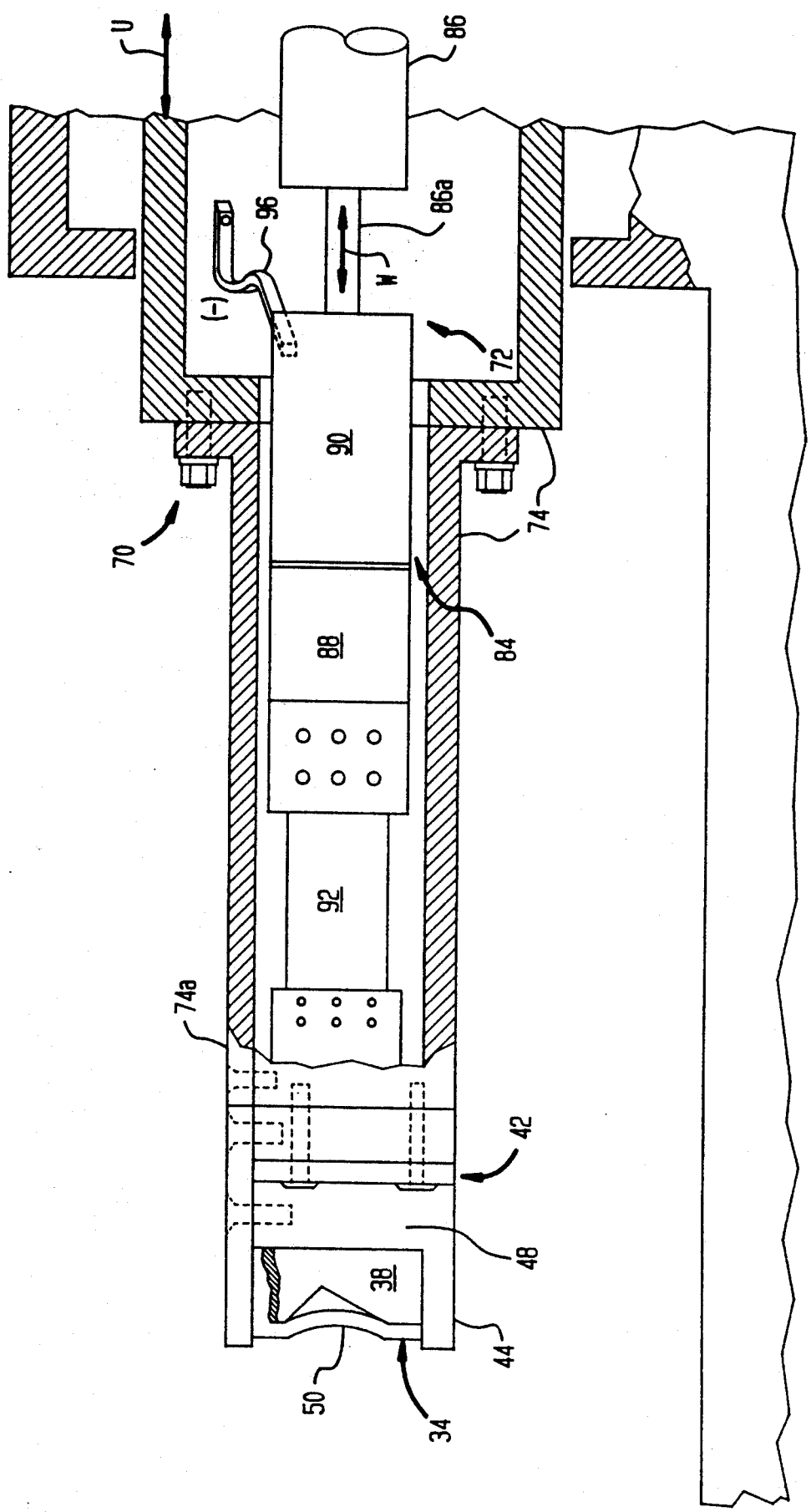
FIG. 6 is an elevation view, partly in section, of the first cathode trio and supporting arm illustrated in FIG. 5 and taken along line 6—6 thereof.
Figure 7:
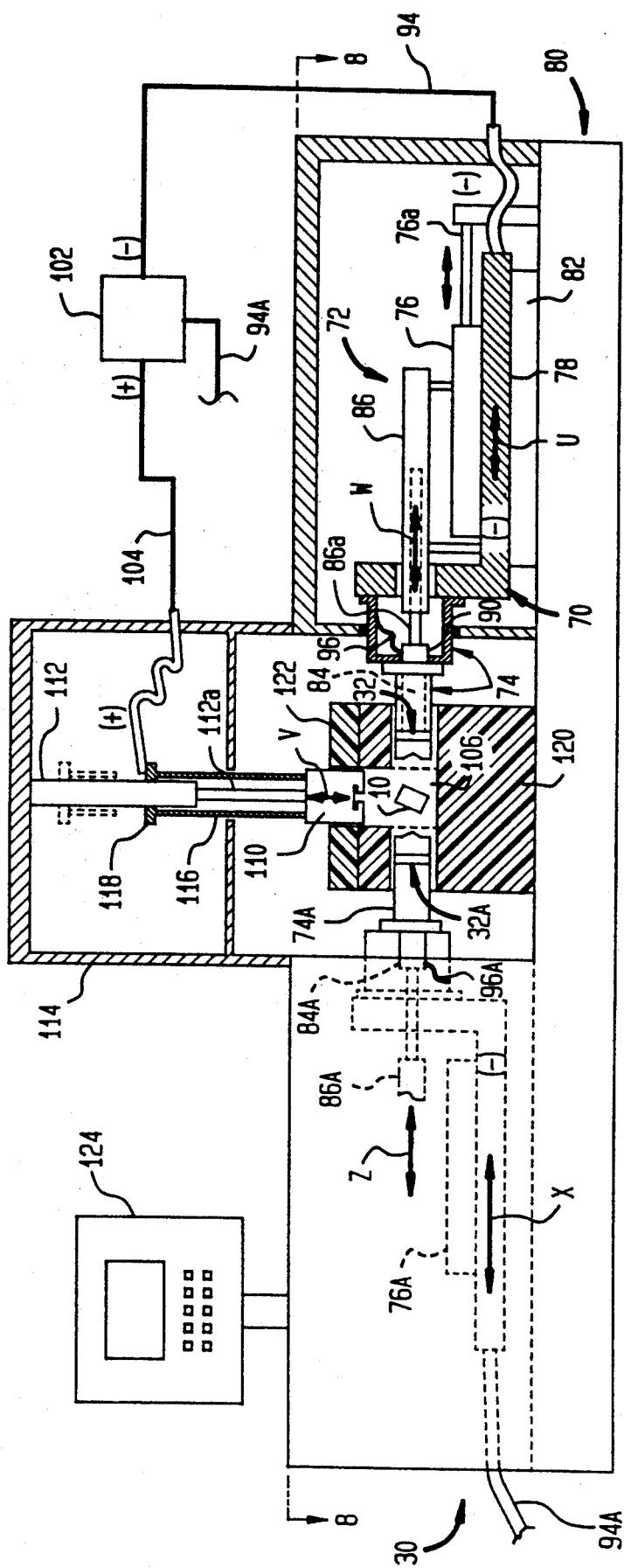
FIG. 7 is a schematic, elevation, partly sectional view of the apparatus illustrated in FIG. 2 in accordance with a preferred embodiment of the present invention.

As illustrated in more particularity in FIGS. 5 and 6, the first translating means 70 include in an exemplary embodiment a first support arm 74 fixedly joined to the first cathode trio frame 42, by bolts, for example. A conventional first servomotor 76, which may be hydraulic for example, is illustrated in FIG. 7 and is operatively joined to the first support arm 74 for selectively translating the first cathode trio frame 42 toward and away from the workpiece 12. As shown in more particularity in FIGS. 7 and 8, the first translating means 70 further include a first support bed 78 conventionally slidably joined to a stationary support frame 80 on conventional rails 82, for example. The first servomotor 76 is operatively joined between the first bed 78 and the support frame 80 for selectively translating the first bed 78 relative to the support frame 80. In the exemplary embodiment illustrated, the first servomotor 76 is conventionally fixedly joined to the first bed 78 and includes an output rod 76a which has a distal end fixedly joined to a flange extending from the frame 80.

Accordingly, as the output rod 76a is selectively extended and retracted from the first servomotor 76, the first servomotor 76 translates relative to the stationary output rod 76a, and in turn, the first bed 78 also translates in the U direction relative to the support frame 80. Of course, the servomotor 76 could, alternatively, be fixedly joined to the support frame 80, with its output rod 76a being joined to the first bed 78, with extension and retraction of the output rod 76a similarly translating the first bed 78 in the U direction relative to the support frame 80.

Translation of the first bed 78 in the U direction translates in turn the first support arm 74 fixedly joined thereto, and in turn translates the first cathode trio frame 42 in the U direction. In this way, the center cathode 34 may be positioned adjacent to the airfoil first side 16 in its initial position as illustrated in FIG. 5, for example, and then further translated forwardly toward the airfoil first side 16 during machining thereof.

Referring again to FIG. 5, the second translating means 72 includes a second support arm 84 fixedly joined to the first and second cathodes 36 and 38, and preferably inside the first arm 74. A conventional second servomotor 86, which also is hydraulic in the preferred embodiment, is conventionally fixedly supported to the first bed 78 as illustrated in FIGS. 7 and 8, and is operatively joined to the second support arm 84 for translating the first and second cathodes 36, 38 relative to the center cathode 34 in the first cathode trio frame 42 selectively toward and away from the workpiece 10.

More specifically, and referring to FIG. 5, the second support arm 84 preferably includes a dovetail base 88 removably fixedly joined to a complementary dovetail post 90 extending from an output rod 86a of the second servomotor 86. The dovetail base 88 and post 90 are wedged tightly together by a suitable wedge 90a. Two groups of conventional leaf springs 92 are fixedly joined at first ends thereof to the dovetail base 88, by bolts for example, and at opposite ends thereof to the first and second cathodes 36 and 38, respectively, for translating the first and second cathodes 36 and 38 relative to the center cathode 34 while allowing the first and second cathodes 36 and 38 to resiliently spread apart along the workpiece stacking axis 14 as the first and second cathodes 36 and 38 are moved toward the workpiece 10 relative to the center cathode 34.

The two groups of leaf springs 90 are disposed generally parallel to the longitudinal axis 40, or may be suitably inclined relative thereto, for providing a suitably rigid connection between the cathodes 36, 38 and the dovetail base 88 in the W direction so that the cathodes 36 and 38 may be translated toward the airfoil 12. Since the cathodes 36 and 38 must necessarily spread apart from each other as they are moved along the ramps 52, 54, the leaf springs 92 allow the cathodes 36 and 38 to spread apart from each other by the resilient or elastic bending apart of the two groups of leaf springs 92 as shown in phantom line in FIG. 5. Accordingly, as the dovetail base 84 is translated forwardly in the W direction by the second servomotor 86, the first and second cathodes 36 and 38 are also translated in the W direction, with the leaf springs 92 allowing the cathodes 36 and 38 to resiliently spread apart as they climb the center cathode 34.

Figure 8:
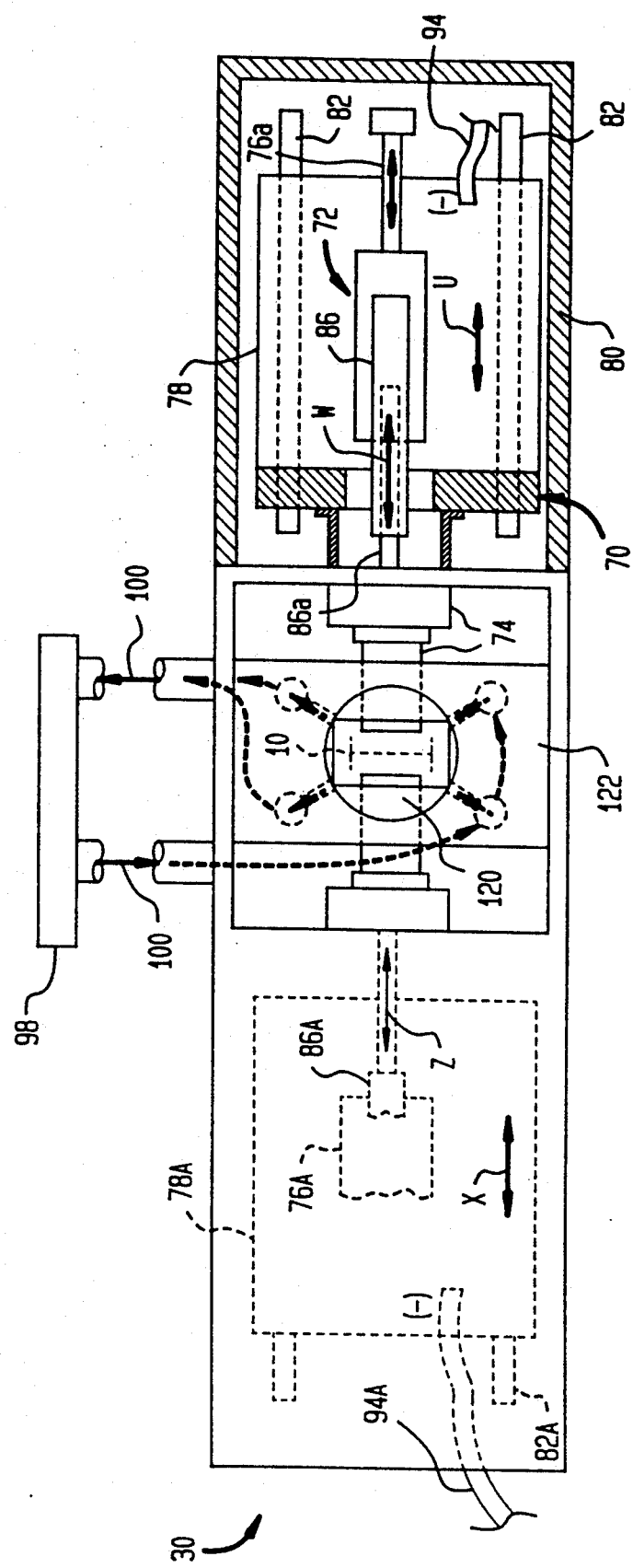
FIG. 8 is a top view of the apparatus illustrated in FIG. 7 taken along line 8—8.

As shown in FIGS. 7 and 8, the second servomotor 86 is conventionally fixedly joined to the first bed 78 for movement therewith in the U direction. And, the output rod 86a joined to the dovetail post 90 is selectively extendable and retractable in the W direction for moving the dovetail base 88, and in turn the leaf springs 92 and the cathodes 36 and 38. In this way, translation in the W direction of the cathodes 36, 38 is additive to the translation of the first support arm 74 carrying the trio 32 in the U direction for moving the cathodes 36 and 38 additionally relative to the center cathode 34.

As illustrated in FIGS. 7 and 8, the apparatus 30 preferably also includes a primary cathode electrical cable 94 electrically joined to the first support arm 74 for carrying electrical current therethrough and through the center cathode 34 during machining. The primary cable 94, in a preferred embodiment, is electrically joined to the first bed 78 by being bolted thereto, for example, so that the entire first bed 78 is maintained at a negative or ground potential, with an electrical current path being provided directly from the first bed 78 to the first support arm 74 fixedly joined thereto. As shown in FIGS. 5 and 6, the first cathode trio frame 42 which is bolted to the first support arm 74, is therefore, maintained at a negative potential in a continuation of the current flowpath to the primary cable 94, and in turn, the center cathode 34 fixedly joined to the frame 42 is also maintained at the negative potential in direct current flowpath to the primary cable 94.

Also as shown in FIGS. 5-7, a secondary cathode electrical cable 96 is preferably electrically joined between the first and second support arms 74 and 84 for independently carrying electrical current through the second support arm 84 directly to the first and second cathodes 36 and 38. The primary cable 94 provides a current path to the first bed 78 and in turn the first support arm 74, and the secondary cable 96 provides a direct current path from the first bed 78 through the first support arm 74 to the second support arm 84 and in turn to the first and second cathodes 36. As shown in FIG. 5, the secondary cable 96 is joined to the dovetail post 90 for carrying current directly through the relatively tight joint between the dovetail post 90 and the dovetail base 88 for in turn providing a current path through the leaf springs 92 to the first and second cathodes 36 and 38. Since the first and second cathodes 36 and 38 slide relative to the center cathode 34, the electrical current path therebetween may be compromised by the required sliding fit clearances therebetween. By independently, and directly electrically joining the first and second cathodes 36 and 38 through the second support arm to the first bed 78 as above described, a suitable current path is provided for carrying the relatively large currents required for electochemically marchining.

Referring again to FIGS. 2 and 4, the apparatus 30 preferably also includes a second cathode trio designated 32A which is configured substantially identically to the first cathode trio 32 except that the first, second, and center cathodes thereof, designated 36A, 38A, and 34A are configured for electrochemically machining the workpiece second side 18 and the first and second platforms 24a and 26a adjacent thereto.

Figure 9:
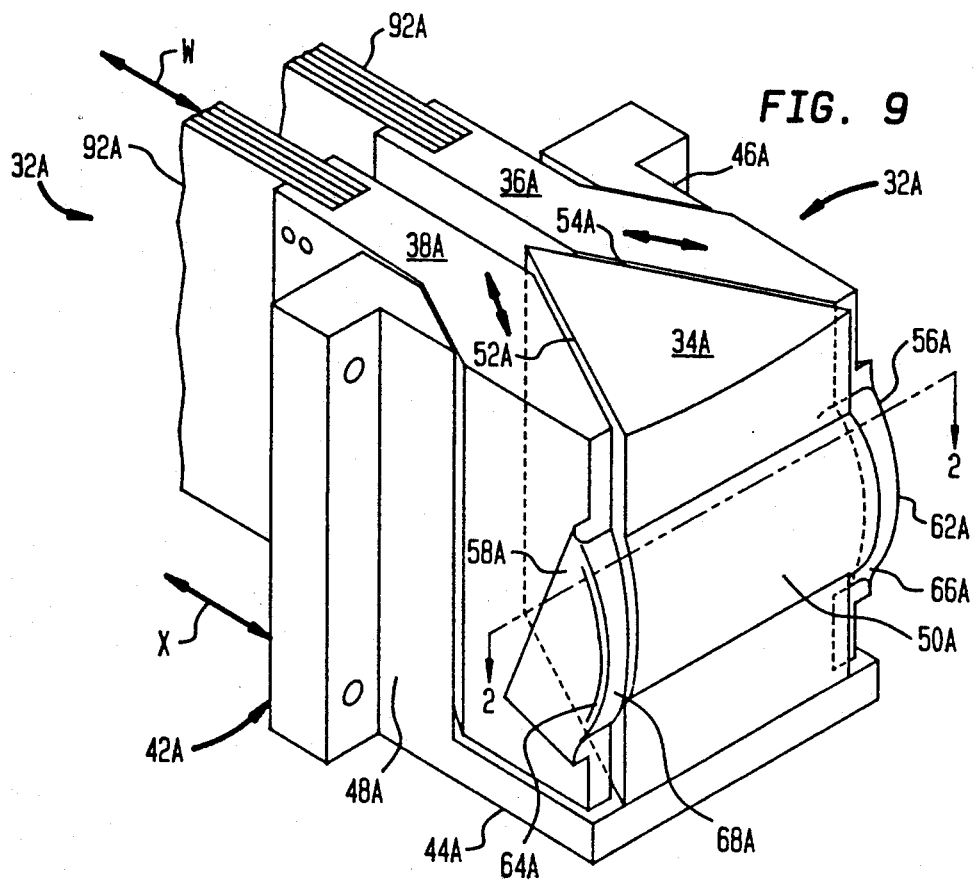

As illustrated in FIG. 9, the second cathode trio 32A is substantially identical in structure and function to the first cathode trio 32 illustrated in FIG. 3, and, therefore, includes identical components designated with a "A" suffix including components 34A-58A and 62A-68A. Since in the exemplary embodiment, the airfoil second side 18 is concave outwardly, the workfaces 50A, 66A, and 68A are configured complementarily thereto and generally convex outwardly as illustrated. Except for the particular configuration of the respective workfaces of the first and second cathode trios 32 and 32A, the cathode trios 32, 32A are otherwise identical in structure and function.

Referring again to FIGS. 2 and 4, the apparatus 30 further includes third and fourth means 70A and 72A, respectively, for translating the frame 42A and the first and second cathodes 36A, 38A of the second cathode trio 32A in respective X and Z directions parallel to the longitudinal axis 40. The third and fourth translating means 70A and 72A are configured substantially identically to the first and second translating means 70, 72, respectively, except that they are on the opposite side of the workpiece 10. The third and fourth translating means 70A and 72A provide mirror strucures to those in the first and second translating means 70 and 72, respectively, including all analogous components identified by an "A" suffix, i.e. 74A-78A and 82A-96A some of which are illustrated in FIGS. 7 and 8, and those not being shown being identical to their corresponding components without the suffix "A".

As illustrated schematically in FIG. 2, the apparatus 30 also includes conventional means 98 for channeling a conventional electrolyte 100 between the workpiece 10 and the first and second cathode trios 32, 32A. Conventional means 102 including a conventional power supply are provided for powering the first and second cathode trios 32, 32A with a negative voltage and the workpiece 10 with a positive voltage as schematically represented by the electrical leads extending separately to the workpiece 10 and the respective cathodes in the first and second cathode trios 32, 32A. One embodiment of the apparatus 30 illustrated in FIGS. 2 and 4 is shown schematically in FIGS. 7 and 8. The electrolyte channeling means 98 is conventionally joined to the apparatus support frame 80 by suitable conduits for selectively channeling the electrolyte 100 thereto and therefrom. The powering means 102 is conventionally joined to the first and second cathode trios 32, 32A through electrical lines joined to the primary cathode cables 94, 94A, and to a conventional electrical anode cable 104 operatively joined to the workpiece 10 as described below.

Figure 10:
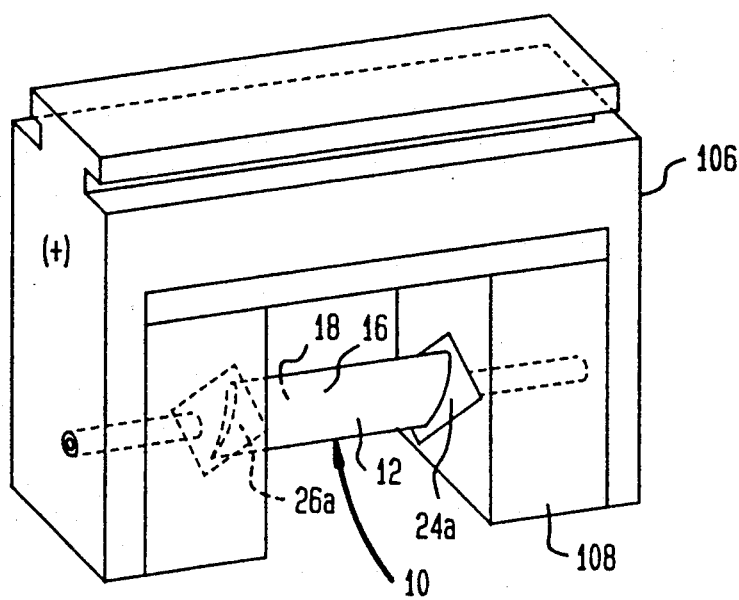
FIG. 10 is a perspective view of a shuttle for supporting the workpiece illustrated in FIG. 1.

More specifically, the workpiece 10 is suitably fixtured in a shuttle 106 as shown in more particularity in FIG. 10. In this exemplary embodiment, the shuttle 106 is generally a U-shaped structure made from brass, and includes a U-arrangement of nylon blocks 108 (e.g. sold under the trademark Delrin) suitably secured in the shuttle 106. The workpiece 10 is suitably fixedly positioned between the blocks 108 with its airfoil 12 and platforms 24a, 26a being exposed and positioned for suitable alignment with the first and second cathode trios 32, 32A and positioned therebetween. The workpiece 10 is suitably electrically joined to the shuttle 106 by conventional electrically conducting members and secured in place by bolts shown in phantom so that current may be channeled between the shuttle 106 and the workpiece 10. The top of the shuttle 106 includes a conventional dovetail post which is conventionally secured in a complementary dovetail chuck 110 illustrated in FIG. 7.

Referring to FIG. 7, the dovetail chuck 110 is preferably copper and is fixedly joined to an output rod 112a of a conventional elevating servomotor 112 itself conventionally fixedly joined to an elevator frame 114 extending upwardly from the support frame 80. The servomotor 112 is conventionally effective for selectively extending and retracting the output rod 112a for lowering or lifting the shuttle 106 in the vertical direction designated V. Also extending upwardly from the chuck 110 are a pair of copper rods 116 joined together at an opposite end to an annular flange 118, to which flange 118 the anode cable 104 is fixedly joined. In this way, when the servomotor 112 lowers the shuttle 106 into position for electrochemical machining, a direct current path is provided from the anode cable 104 through the rods 116 to the chuck 110 and in turn to the shuttle 106, and in turn to the workpiece 10 supported therein.

In order to suitably contain the flow of electrolyte 100 during machining, the apparatus 30 preferably further includes a flowbox 120 which is electrically nonconducting, noncorrosive and will not absorb the electrolyte 100, which may be made from a conventional laminated fiberglass/epoxy material conventionally known as ASTM G-10. The flowbox 120 is supported on the frame 80 and disposed between the two cathode trios 32, 32A and includes side openings therein through which the cathode trios 32, 32A may be translated during operation. Suitable seals may be provided around the respective support arms 74, 74A where they enter the flowbox 120 for reducing leakage of the electrolyte 100 therefrom. As shown in FIGS. 5 and 6, the first support arm 74 has a generally U-shaped distal end in which the second support arm 84 is disposed. A cover plate 74a, shown as two pieces, is removably joined to the first support arm 74 to fully enclose the second support arm 84. The flowbox seals slidably contact the outer surface of the support arm 74 to reduce leakage of the electrolyte 100 as the arm translates through the flowbox 120.

A nylon top seal plate 122 (e.g., also sold under the trademark Delrin) is suitably fixedly joined to the top of the flowbox 122 by machine screws for example, and includes a central aperture through which the chuck 110 may be inserted in sealing contact therewith. The flowbox 120 includes a central generally rectangular cavity in which the shuttle 106 is lowered into position for machining of the workpiece 10. The shuttle 106 illustrated in FIG. 10 is configured complementarily to the cavity in the flowbox 120 for providing a relatively close fit therein for alignment and reducing leakage of the electrolyte 100 from its preferred flowpath between the cathode trios 32, 32A and the workpiece 10.

Referring to both FIGS. 8 and 10, the workpiece 10 fixtured in the shuttle 106 is positioned in the cavity of the flowbox 120 so that the cathode trios 32, 32A may be suitably translated toward the respective airfoil sides 16 and 18. The flowbox 120 includes suitable channels therein for channeling the electrolyte 100 preferably along the stacking axis of the workpiece 10 from the second platform 26a toward the first platform 24a in this exemplary embodiment. The electrolyte 100 is then suitably channeled through the flowbox 120 and is carried through conduits back to the electrolyte channeling means 98.

Also illustrated in FIG. 7 are conventional means 124, including a conventional central processing unit (CPU), for controlling operation of the first, second, third, and fourth translating means (70, 72, 70A, 72A), the electrolyte channeling means 98 and the powering means 102 for controlling the electrochemical machining operation. The control means 124 are conventionally operatively joined to all of these components for coordinating the operation thereof.

An improved method of forming the product vane 10a from the workpiece 10 includes the steps of positioning the first and second cathode trios 32, 32A adjacent to the workpiece first and second sides 16, 18, respectively, as shown in solid line in FIG. 4. The method also includes supplying a positive voltage between about 5 and 25 volts DC at up to about 15,000 amperes, or more as required, to the workpiece 10, and a negative voltage to the first and second cathode trios 32, 32A. At the same time, the electrolyte 100 is channeled between the workpiece 10 and the first and second cathode trios 32, 32A for electrochemically machining the workpiece 10.

The method also includes moving, or translating, the first and second cathode trios toward the respective workpiece first and second sides 16 and 18 generally along the longitudinal axis 40 and along the respective U and X axes. The first and second cathodes 36, 38 of the respective cathode trios 32, 32A are then simultaneously moved toward the airfoil first and second sides 16, 18, respectively, and toward the first and second platforms 24a, 26a relative to the movement of the center cathodes 34, 34A of the respective cathode trios 32, 32A. In this way, the cathode trios 32, 32A simultaneously electrochemically machine both the airfoil 12 and the first and second platforms 24a, 26a to form the final product, or vane 10a, as shown in solid line in FIG. 2 and in FIG. 1.

In the preferred embodiment, the four fillets 60 on opposite sides of the airfoil 12 at the juncture with the platforms 24a, 26a are simultaneously electrochemically machined as the respective first and second cathodes 36, 38 of the cathode trios 32, 32A are moved to their final position as shown in FIG. 2. And, as described above, a negative voltage may be supplied to both to the first and second cathodes 36, 38 of the respective cathode trios 32, 32A independently of the center cathodes 34, 34A thereof by using the primary and secondary cathode cables 94 and 96.

The final product or vane 10a as shown in FIG. 1 formed from using the electrochemical machining apparatus of the present invention includes finally dimensioned platforms 24a, 26a, airfoil 12 therebetween, and fillets 60 which require no further machining or benching in the preferred embodiment. However, small cusps may be formed where the leading edge 20 and the trailing edge 22 join the respective platforms 24a, 26a which may require benching to remove. However, the major machined surface area including the airfoil first and second sides 16, 18 and the platforms 24a, 26a may be completely finished without the need for additional work thereon.

The cathode trios 32, 32A and the respective support arms 74, 84 are preferably made from conventional materials such as copper-tungsten for the former and brass for the latter due to the corrosive environment of the electrolyte 100. The leaf springs 92 may also be brass, or copper, with brass or copper providing suitable structural strength for the required movement as well as providing electrical flowpaths for channeling the relatively high currents required for electrochemical machining.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention. For example, the workpiece 10 may also be in the form of a shrouded rotor blade, or other component having two transverse platforms joined to a center member.

Accordingly, what is desired to be secured by Letters Patent of the United States is the invention as defined and differentiated in the following claims:

We claim:

1. An apparatus for electrochemically machining a workpiece including an airfoil having a stacking axis, first and second sides, and first and second platforms extending transversely from said stacking axis at opposite ends of said airfoil comprising:

a first cathode trio including an assembly of a center cathode disposed between first and second cathodes, said center cathode being configured for electrochemically machining said airfoil first side, and said first and second cathodes being configured for electrochemically machining at least said first and second platforms, respectively, adjacent to said airfoil first side, said first and second cathodes being movable simultaneously relative to said center cathode.

2. An apparatus according to claim 1 wherein said first cathode trio further includes a frame having a base and first and second spaced apart posts extending away therefrom, said center cathode being fixedly joined to said base between said first and second posts, said first cathode being slidably disposed between said center cathode and said first post, and said second cathode being slidably disposed between said center cathode and said second post.

3. An apparatus according to claim 2 wherein:
said center cathode includes an imperforate workface configured for electrochemically machining said airfoil first side;
said first cathode includes a platform workface disposed transversely to said center cathode workface and configured for electrochemically machining said first platform; and
said second cathode includes a platform workface disposed transversely to said center cathode workface and configured for electrochemically machining said second platform.

4. An apparatus according to claim 3 wherein said center cathode is triangular and includes first and second ramps extending rearwardly from said center cathode workface to form an acute angle therebetween, said first and second ramps being disposed parallel to said first and second posts for guiding said first and second cathodes in sliding movement therebetween.

5. An apparatus according to claim 4 wherein said workpiece includes fillets between said airfoil and said first and second platforms, and said first and second cathodes further include arcuate workfaces disposed between said center cathode workface and said first and second cathode platform workfaces, respectively, for electrochemically machining said fillets.

6. An apparatus according to claim 5 wherein said first and second cathodes further include airfoil workfaces disposed between said center cathode workface and said first and second cathode arcuate workfaces, respectively, configured for electrochemically machining said airfoil adjacent said fillets.

7. An apparatus according to claim 5 further including:
first means for translating said first cathode trio frame toward said workpiece; and
second means for translating said first and second cathodes relative to said center cathode toward said airfoil first side so that as said center cathode electrochemically machines said airfoil first side, said first and second cathodes slide along said center cathode both toward said airfoil first side and away from each other generally parallel to said stacking axis toward said workpiece first and second platforms for simultaneously electrochemically machining said workpiece first and second platforms, respectively.

8. An apparatus according to claim 7 wherein said first translating means include:
a first support arm fixedly joined to said first cathode trio frame; and
a first servomotor operatively joined to said first support arm for selectively translating said first cathode trio frame toward and away from said workpiece.

9. An apparatus according to claim 8 wherein:
said first translating means further include a first bed slidably joined to a stationary support frame, and said first servomotor is operatively joined therebetween for translating said first bed relative to said support frame; and
wherein said second translating means include:

a second support arm fixedly joined to said first and second cathodes; and
a second servomotor fixedly supported by said first bed, and operatively joined to said second support arm for translating said first and second cathodes relative to said center cathode selectively toward and away from said workpiece.

10. An apparatus according to claim 9 wherein said second support arm includes:
a dovetail base fixedly joined to a complementary dovetail post extending from said second servomotor; and
two groups of leaf springs fixedly joined at first ends to said dovetail base and at opposite ends to said first and second cathodes, respectively, for translating said first and second cathodes relative to said center cathode while allowing said first and second cathodes to resiliently spread apart along said workpiece stacking axis as said first and second cathodes are moved toward said workpiece relative to said center cathode.

11. An apparatus according to claim 10 further including:
a primary cathode electrical cable electrically joined to said first support arm for carrying electrical current through said center cathode; and
a secondary cathode electrical cable electrically joined between said first and second support arms for independently carrying electrical current through said second support arm directly to said first and second cathodes.

12. An apparatus according to claim 11 further including a second cathode trio being configured substantially identically to said first cathode trio except that said first, second, and center cathodes thereof are configured for electrochemically machining said workpiece second side and said first and second platforms adjacent thereto.

13. An apparatus according to claim 12 further including third and fourth means for translating said frame and said first and second cathodes of said second cathode trio, said third and fourth translating means being configured substantially identically to said first and second translating means, respectively.

14. An apparatus for electrochemically machining a workpiece including an airfoil having a stacking axis, first and second sides, and first and second platforms extending transversely from said stacking axis at opposite ends of said airfoil comprising:
a support frame;
a first cathode trio including a center cathode disposed between first and second cathodes, said center cathode being configured for electrochemically machining said airfoil first side, and said first and second cathodes being configured for electrochemically machining at least said first and second platforms, respectively, adjacent to said airfoil first side, said first and second cathodes being movable relative to said center cathode;
a second cathode trio including a center cathode disposed between first and second cathodes, said center cathode thereof being configured for electrochemically machining said airfoil second side, and said first and second cathodes thereof being configured for electrochemically machining at least said first and second platforms, respectively, adjacent to said airfoil second side, said first and second cathodes of said second cathode trio being movable relative to said center cathode thereof;

each of said first and second cathode trios including a frame having a base and first and second spaced apart posts extending away therefrom, said center cathode being fixedly joined to said base between said first and second posts, said first cathode being slidably disposed between said center cathode and said first post, and said second cathode being slidably disposed between said center cathode and said second post;

first means for translating said first cathode trio frame toward said workpiece;

second means for translating said first and second cathodes of said first cathode trio relative to said center cathode thereof toward said airfoil first side so that as said center cathode electrochemically machines said airfoil first side, said first and second cathodes slide along said center cathode both toward said airfoil first side and away from each other generally parallel to said stacking axis toward said workpiece first and second platforms for simultaneously electrochemically machining said workpiece first and second platforms, respectively, adjacent to said first side;

third means for translating said second cathode trio frame toward said workpiece;

fourth means for translating said first and second cathodes of said second cathode trio relative to said center cathode thereof toward said airfoil second side so that as said center cathode electrochemicaly machines said airfoil second side, said first and second cathodes slide along said center cathode both toward said airfoil second side and away from each other generally parallel to said stacking axis toward said workpiece first and second platforms for simultaneously electrochemically machining said workpiece first and second platforms, respectively, adjacent to said second side;

means for channeling an electrolyte between said workpiece and said first and second cathode trios;

means for powering said first and second cathode trios with a negative voltage and said workpiece with a positive voltage; and means for controlling said first, second, third, and fourth translating means, said electrolyte channeling means, and said powering means.

15. A apparatus according to claim 14 wherein said workpiece includes fillets between said airfoil and said first and second platforms, and wherein for each of said first and second cathode trios:

said center cathode is triangular and includes an imperforate workface configured for electrochemically machining respective ones of said airfoil first and second sides, and first and second ramps extending rearwardly from said center cathode workface to form an acute angle therebetween, said first and second ramps being disposed parallel to said first and second posts for guiding said first and second cathodes in sliding movement therebetween;

said first cathode includes a platform workface disposed transversely to said center cathode workface and configured for electrochemically machining said first platform, and an arcuate workface disposed between said center cathode workface and said first platform workface for electrochemically machining a respective one of said fillets; and said second cathode includes a platform workface disposed transversely to said center cathode workface and configured for electrochemically machining said second platform, and an arcuate workface between said center workface and said second platform workface for electrochemically machining a respective one of said fillets.

16. A method of forming a product from a workpiece including an airfoil having a stacking axis, first and second sides, and first and second platforms extending transversely from said stacking axis at opposite ends of said airfoil comprising:

positioning first and second cathode trios adjacent to said workpiece first and second sides, respectively, each of said first and second cathode trios including a center cathode disposed between first and second cathodes;

supplying a positive voltage to said workpiece and a negative voltage to said first and second cathode trios;

channeling an electrolyte between said workpiece and said first and second cathode trios for electrochemically machining said workpiece;

moving said first and second cathode trios toward said airfoil first and second sides, respectively; and moving said first and second cathodes of each of said first and second cathode trios toward said airfoil first and second sides and toward said first and second platforms relative to said movement of said center cathodes, respectively, for simultaneously electrochemically machining said airfoil and said first and second platforms to form said product.

17. A method according to claim 16 wherein said workpiece includes fillets between said airfoil and said first and second platforms, and said first and second cathodes of said first and second cathode trios include arcuate workfaces for electrochemically machining said workpiece fillets as said first and second cathode trios are moved toward said airfoil and said platforms.

18. A method according to claim 17 further comprising supplying a negative voltage to both of said first and second cathodes independently of said center cathodes of each of said first and second cathode trios.

19. The product formed by electrochemically machining said workpiece using the method of claim 18.

20. The product formed by electrochemically machining said workpiece using the method of claim 17.

* * * * *